US012116164B2

(12) United States Patent
Cheng et al.

(10) Patent No.: US 12,116,164 B2
(45) Date of Patent: Oct. 15, 2024

(54) TRANSPORT MECHANISM OF SERVER RACK AND PALLET STRUCTURE

(71) Applicant: Wiwynn Corporation, New Taipei (TW)

(72) Inventors: Hao-Ting Cheng, New Taipei (TW); Jheng-Ying Jiang, New Taipei (TW); Pei-Pei Lee, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 62 days.

(21) Appl. No.: 17/987,869

(22) Filed: Nov. 16, 2022

(65) Prior Publication Data
US 2024/0116673 A1    Apr. 11, 2024

(30) Foreign Application Priority Data

Oct. 6, 2022    (TW) .................................. 111138015

(51) Int. Cl.
*B65D 19/44*          (2006.01)

(52) U.S. Cl.
CPC .... *B65D 19/44* (2013.01); *B65D 2519/00815* (2013.01)

(58) Field of Classification Search
CPC ...... B65D 19/44; B65D 65/44; B65D 81/107; B65D 81/1075; B65D 81/113; B65D 81/127; B65D 81/1275; B65D 81/133; B65D 85/30; B65D 2519/00815; B65D 2585/30; B65D 2585/86
USPC ...... 206/599, 722, 725; 211/85.8; 108/57.12
See application file for complete search history.

(56) References Cited

U.S. PATENT DOCUMENTS

| | | | | |
|---|---|---|---|---|
| 4,863,024 A * | 9/1989 | Booth | ................ | B65D 19/0016 |
| | | | | 206/386 |
| 5,039,036 A * | 8/1991 | Rogers | ..................... | B64D 1/14 |
| | | | | 244/138 R |
| 5,195,439 A * | 3/1993 | Harder | ............... | B65D 19/0026 |
| | | | | 108/901 |
| 5,676,063 A * | 10/1997 | Wallace | ................. | B65D 19/44 |
| | | | | 108/55.3 |
| 6,418,862 B1 * | 7/2002 | Heil | ................... | B65D 19/0028 |
| | | | | 108/57.12 |
| 6,609,467 B2 * | 8/2003 | Monson | ............. | B65D 19/0012 |
| | | | | 108/57.12 |
| 7,219,609 B1 * | 5/2007 | Utz | ........................ | B65D 19/44 |
| | | | | 108/55.3 |

(Continued)

FOREIGN PATENT DOCUMENTS

TW    201613808    4/2016

OTHER PUBLICATIONS

"Office Action of Taiwan Counterpart Application", issued on Jan. 5, 2023, p. 1-p. 6.

*Primary Examiner* — Joshua E Rodden
(74) *Attorney, Agent, or Firm* — JCIPRNET (57) ABSTRACT

A transport mechanism of a server rack including a carrier plate, a server rack disposed and fixed onto a top surface of the carrier plate, and multiple supporting assemblies respectively stacked onto a bottom surface of the carrier plate is provided. Each of the supporting assemblies has at least one cushion member. The cushion member has at least one hollow portion, and an opening of the hollow portion is exposed to an environment. The stiffness of the cushion member is smaller than the stiffness of the carrier plate. A pallet structure is also provided.

18 Claims, 10 Drawing Sheets

(56) References Cited

U.S. PATENT DOCUMENTS

| | | | | |
|---|---|---|---|---|
| 7,555,879 B1* | 7/2009 | Utz | ............ | B65D 19/44 |
| | | | | 53/410 |
| 7,637,219 B2* | 12/2009 | Hartel | ............ | B65D 19/40 |
| | | | | 108/51.11 |
| 7,793,828 B2* | 9/2010 | Booth | ............ | G07F 19/20 |
| | | | | 108/55.3 |
| 8,231,004 B2* | 7/2012 | Port | ............ | B65D 71/0096 |
| | | | | 206/440 |
| 8,397,916 B1* | 3/2013 | Cassidy | ............ | B65D 19/0028 |
| | | | | 206/386 |
| 9,291,234 B1* | 3/2016 | Green | ............ | B65D 19/38 |
| 9,932,144 B2* | 4/2018 | Embleton | ............ | B65D 19/0012 |
| 10,059,487 B2* | 8/2018 | Sun | ............ | F16F 1/374 |
| 10,398,046 B2* | 8/2019 | Chen | ............ | H05K 5/0234 |
| 10,822,141 B1* | 11/2020 | Qi | ............ | B65D 19/0073 |
| 10,883,648 B2* | 1/2021 | Notohardjono | ............ | F16M 11/22 |
| 2002/0056386 A1* | 5/2002 | Sekino | ............ | B65D 19/44 |
| | | | | 101/368 |
| 2007/0221102 A1* | 9/2007 | Reinhall | ............ | B65D 19/0073 |
| | | | | 108/57.12 |
| 2007/0283858 A1* | 12/2007 | Ballard | ............ | B65D 19/0016 |
| | | | | 108/57.12 |
| 2011/0266177 A1* | 11/2011 | Lowry | ............ | B65D 19/44 |
| | | | | 53/399 |
| 2014/0086718 A1* | 3/2014 | Bush | ............ | B65D 19/0073 |
| | | | | 414/800 |
| 2016/0107793 A1* | 4/2016 | Jiang | ............ | B65D 19/42 |
| | | | | 206/386 |
| 2018/0134445 A1* | 5/2018 | Chezem | ............ | B65D 81/054 |
| 2020/0062482 A1* | 2/2020 | Alfoqaha | ............ | B65D 19/44 |
| 2023/0027778 A1* | 1/2023 | Kabe | ............ | B65D 81/02 |
| 2024/0116673 A1* | 4/2024 | Cheng | ............ | B65D 19/06 |

* cited by examiner

TRANSPORT MECHANISM OF SERVER RACK AND PALLET STRUCTURE

CROSS-REFERENCE TO RELATED APPLICATION

This application claims the priority benefit of Taiwan application serial no. 111138015, filed on Oct. 6, 2022. The entirety of the above-mentioned patent application is hereby incorporated by reference herein and made a part of this specification.

BACKGROUND

Technical Field

The disclosure relates to a transport mechanism of a server rack and a pallet structure.

DESCRIPTION OF RELATED ART

The vibration and impact (for example, caused by road conditions) generated during the transportation of the rack will cause the rack and the server host therein to resonate without proper shock absorption and anti-vibration means, and thus cause damage.

SUMMARY

A transport mechanism of a server rack in the disclosure includes a carrier plate, a server rack, and multiple supporting assemblies. The server rack is disposed and fixed onto a top surface of the carrier plate. The supporting assemblies are respectively stacked onto a bottom surface of the carrier plate. Each of the supporting assemblies includes at least one cushion member. Each of the cushion members has at least one hollow portion, and an opening of the hollow portion is exposed to an external environment. Stiffness of the cushion member is smaller than stiffness of the carrier plate.

A pallet structure in the disclosure includes a carrier plate and multiple supporting assemblies disposed on a bottom surface of the carrier plate, so that a top surface of the carrier plate stands through the supporting assemblies after carrying an object. Each of the supporting assemblies includes at least one cushion member and an abutting member, and the abutting member is located on the bottom surface of the carrier plate. The cushion member is located between the bottom surface of the carrier plate and the abutting member. Each of the cushion members has at least one hollow portion, and an opening of the hollow portion is oriented differently from the carrier plate and the abutting member.

DETAILED DESCRIPTION OF DISCLOSED EMBODIMENTS

Figure 1:
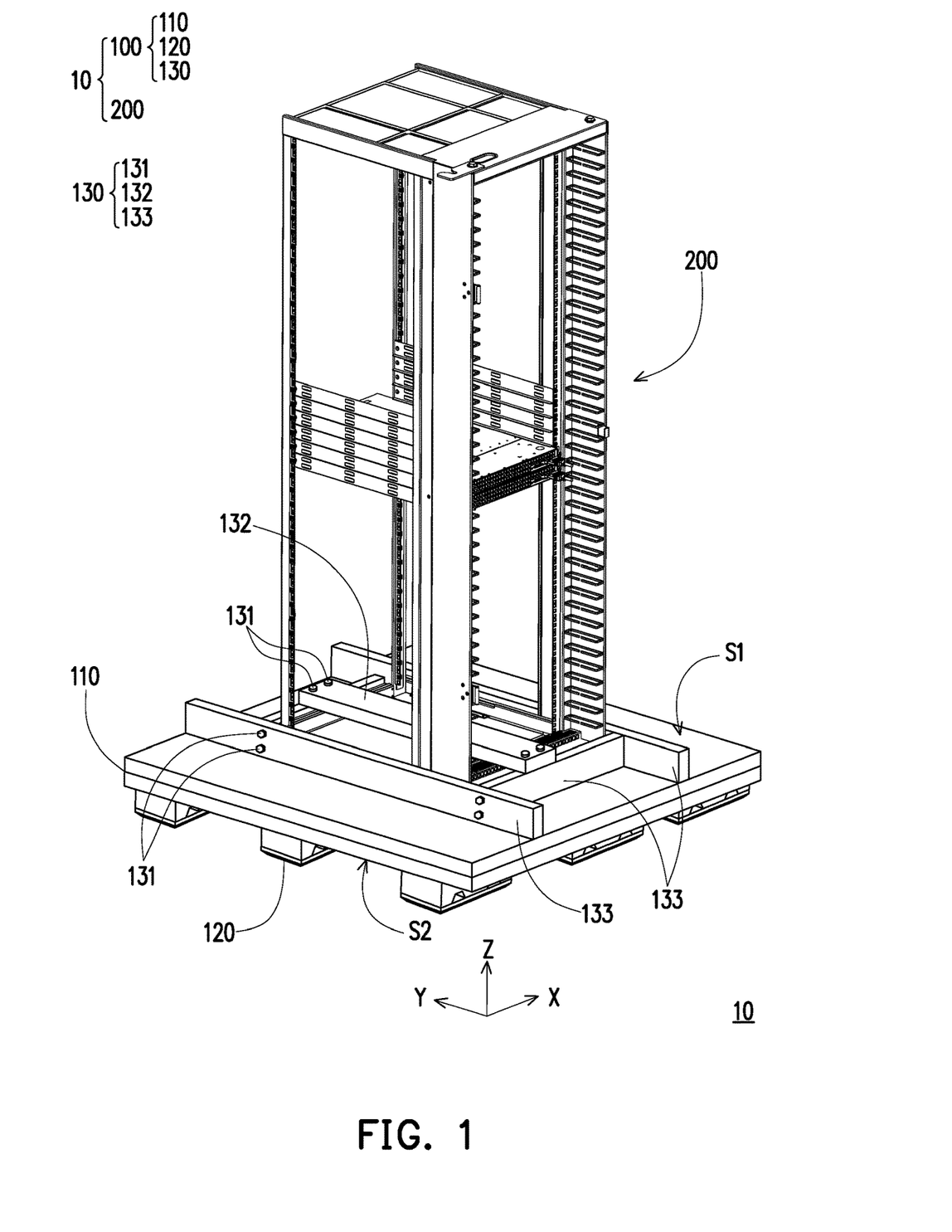
FIG. 1 is a schematic view of a transport mechanism of a server rack according to an embodiment of the disclosure.
Figure 2A:
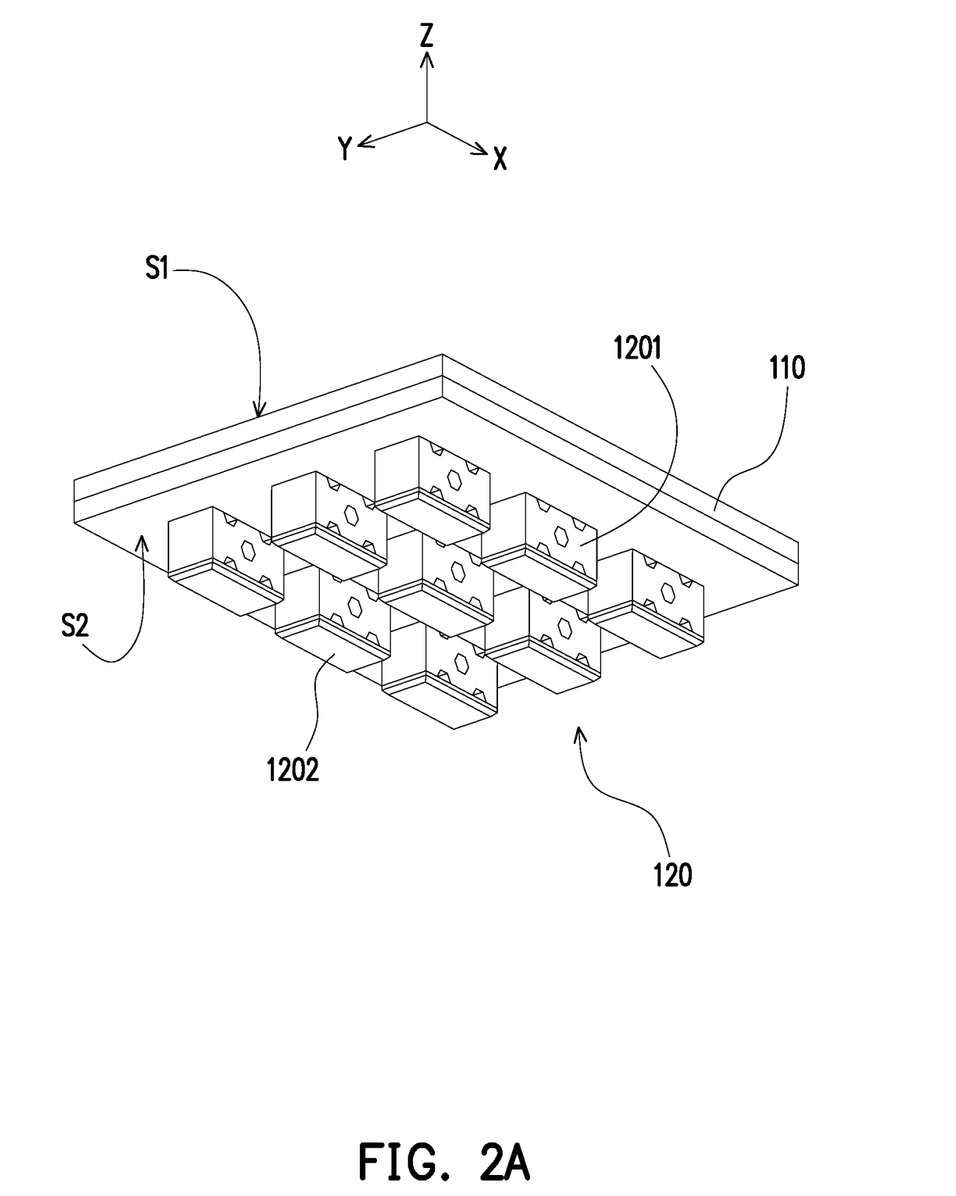
FIG. 2A is a schematic view of some components of the transport mechanism of FIG. 1 from another perspective.
Figure 3:
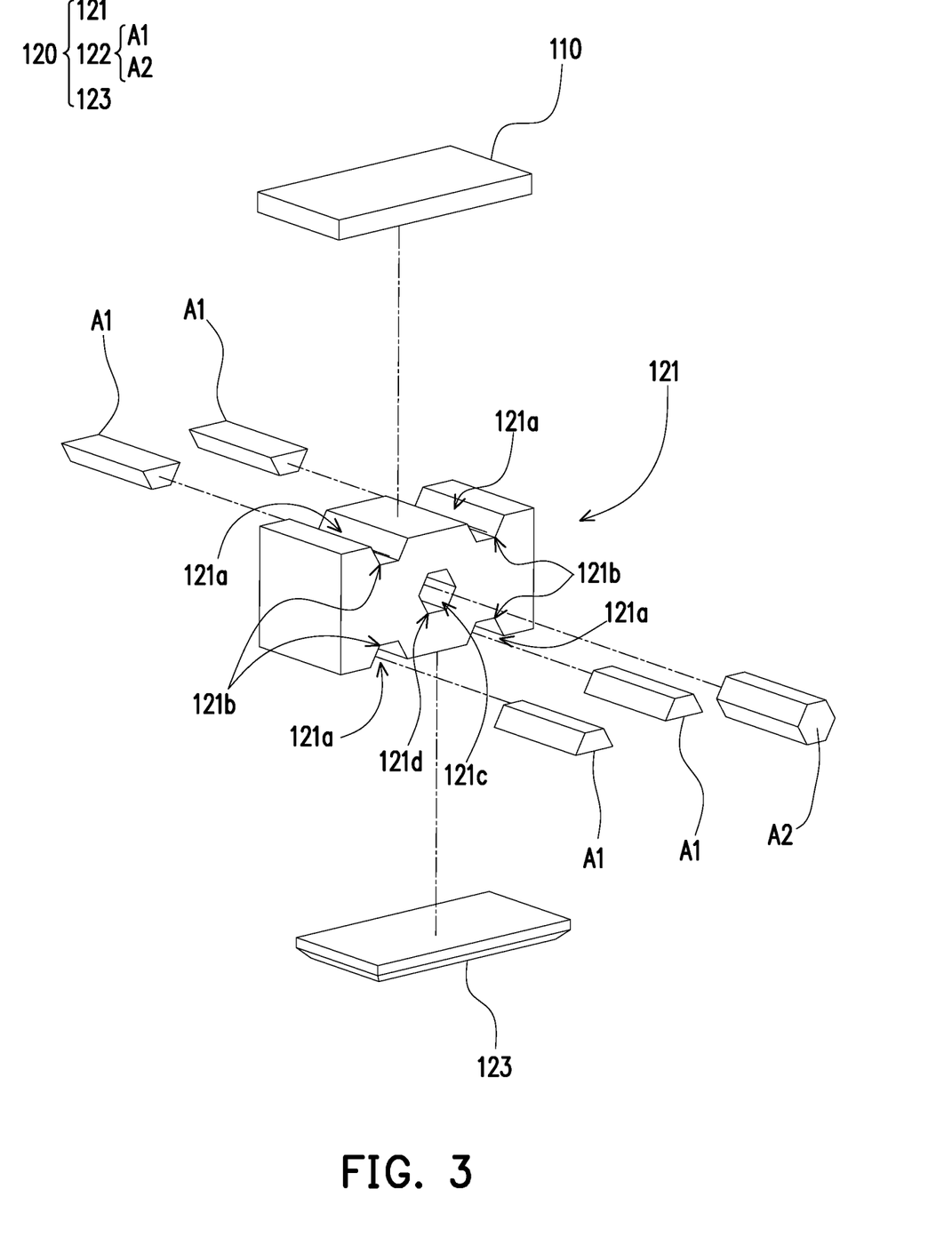
FIG. 3 is a schematic exploded view of a supporting assembly.

FIG. 1 is a schematic view of a transport mechanism of a server rack according to an embodiment of the disclosure. FIG. 2A is a schematic view of some components of the transport mechanism of FIG. 1 from another perspective. FIG. 3 is a schematic exploded view of a supporting assembly. At the same time, Cartesian coordinates XYZ are provided to facilitate description of components. Referring to FIGS. 1 to 3 together, in this embodiment, a transport mechanism 10 of a server rack (hereinafter referred to as the transport mechanism 10) includes a carrier plate 110, a server rack 200, multiple supporting assemblies 120, and a fixing assembly 130. The carrier plate 110, the supporting assemblies 120, and the fixing assembly 130 may be further regarded as a pallet structure 100 for carrying and fixing an object. Here, the object may be the server rack 200. The server rack 200 is disposed and fixed onto a top surface S1 of the carrier plate 110. The supporting assemblies 120 are respectively stacked onto a bottom surface S2 of the carrier plate 110, so that the top surface S1 of the carrier plate 110 may stand through the supporting assemblies 120 after carrying the server rack 200, which is convenient for transportation. Specifically, referring to FIG. 2A, the supporting assemblies 120 in this embodiment are arranged in a matrix on the bottom surface S2 of the carrier plate 110.

As shown in FIG. 3, each of the supporting assemblies 120 includes at least one cushion member 121. The cushion member 121 may be used to reduce vibration and impact during the transportation. Here, the stiffness of the cushion member 121 is smaller than the stiffness of the carrier plate 110. A material of the cushion member 121 may be any elastic material, such as expanded polyethylene (EPE), for absorbing the vibration and impact during the transportation and attenuating the amplitude.

Furthermore, each of the supporting assemblies 120 further includes an abutting member 123 located on the bottom surface S2 of the carrier plate 110 and disposed at a bottom of the cushion member 121, so that the cushion member 121 is located between the bottom surface S2 of the carrier plate 110 and the abutting member 123. In this embodiment, the abutting member 123 is used for supporting the cushion member 121 thereon. Therefore, the stiffness of the abutting member 123 is larger than the stiffness of the cushion member 121, and the abutting member 123 has wear-resistant properties to facilitate contact with the ground. In addition, the abutting member 123 and the carrier plate 110 may be formed by the same material, such as wood or wear-resistant plastic, so that the cushion member 121 with lower stiffness is sandwiched between the carrier plate 110 and the abutting member 123 with higher stiffness.

Referring to both FIGS. 2A and 3, each of the cushion members 121 has at least one hollow portion (a hollow portion 121a and a hollow portion 121c in this embodiment), and openings 121b and 121d of the hollow portions 121a and 121c are exposed to an external environment. More importantly in this embodiment, the openings 121b and 121d of the hollow portions 121a and 121c are oriented differently from the carrier plate 110 and the abutting member 123. In other words, the openings 121b and 121d are oriented neither to face the carrier plate 110 nor to face the abutting member 123. Therefore, in this embodiment, except for being in contact with the carrier plate 110 and the abutting member 123, the cushion member 121 has only four remaining sides for the openings 121b and 121d to be exposed. Therefore, during a process of packaging and fixing the server rack 200 to the pallet structure 100, the user may evaluate whether the durability and anti-vibration effect of the object (e.g., the server rack 200) carried by the pallet structure 100 meet expectations through states of the openings 121b and 121d exposed to the external environment.

More specifically, each of the supporting assemblies 120 in this embodiment further includes at least one filling member 122 to be filled into or removed from the hollow portions 121a and 121c through the openings 121b and 121d of the hollow portions 121a and 121c, so as to change the overall stiffness of the cushion member 121. The overall stiffness of the cushion member 121 may be proportional to the number of the filling members 122. In addition, as mentioned above, the openings 121b and 121d are exposed to the external environment. It is not only convenient for the user to observe, but the user may also easily disassemble and assemble the filling member 122 to the hollow portions 121a and 121c, so as to achieve the effect of quick disassembly and adjustment. In other words, during the process of packaging and fixing the server rack 200 to the pallet structure 100, the user may freely adjust the overall stiffness of the cushion member 121 at any time depending on the situations.

Referring to FIG. 3 again, in this embodiment, the hollow portion 121a is a slot located on a surface of the cushion member 121, and the hollow portion 121c is a through hole passing through the cushion member 121. The filling member 122 may be divided into filling members A1 in a form of a four-sided pillar and a filling member A2 in a form of a six-sided pillar according to the hollow portions 121a and 121c. In other words, the hollow portions 121a and 121c and the filling member 122 are components with outlines complementary to each other. Therefore, friction between the hollow portions 121a and 121c and the filling member 122 may be increased, so as to prevent the filling member 122 from falling off from the hollow portions 121a and 121c during the transportation.

The stiffness of the filling member 122 is not limited here, and in an embodiment, the filling member 122 may be formed by the same material as the cushion member 121. In another embodiment, a material with the stiffness larger than the stiffness of the cushion member 121 may be selected, so as to improve the overall stiffness of the cushion member 121. Of course, in another embodiment, a material with the stiffness smaller than the stiffness of the cushion member 121 may also be selected to improve the flexibility of the cushion member 121.

Furthermore, in this embodiment, the number and shape of the hollow portions 121a and 121c are also not limited, while a relationship to the number and shape of the filling members 122 corresponding to the hollow portions 121a and 121c is also not limited. Therefore, the number of the filling members 122 may be less than or equal to the number of the hollow portions 121a and 121c, so as to adapt to the server rack 200 in different states, while the shape of the filling member 122 may be designed to engage with the hollow portions 121a and 121c. That is, whether the surface of the component is provided with a corresponding concave/convex structure, or only the shapes and outlines interfere with or abut against each other (for example, the hollow portions 121a and 121c are cylindrical holes, and the filling member 122 is a hexagonal prism, or vice versa), they both are possible embodiments of the disclosure to prevent the filling member 122 from falling off from the hollow portions 121a and 121c during the transportation.

Figure 2B:
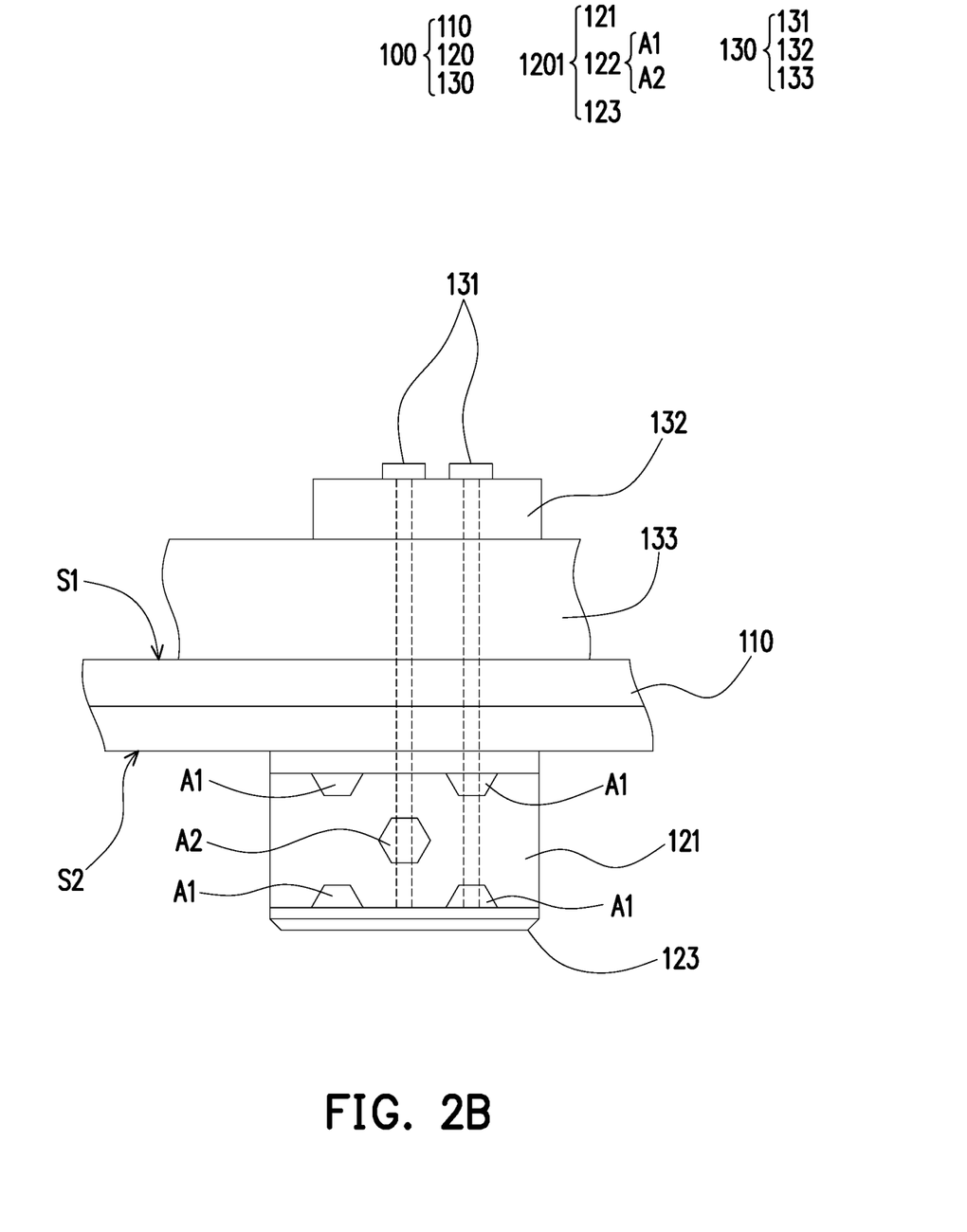
FIG. 2B is a side view of one of supporting assemblies of FIG. 2A.

FIG. 2B is a side view of one of supporting assemblies of FIG. 2A. Referring to FIGS. 1, 2A, and 2B again, in this embodiment, the fixing assembly 130 includes screwing members 131, a pressing strip 132, and fixing plates 133. The pressing strip 132 passes through the server rack 200. The fixing plates 133 surrounds and is fixed to a bottom of the server rack 200. The pressing strip 132 and the fixing plates 133 are screwed and fixed by the screwing members 131, thereby fixing the bottom of the server rack 200 to the top surface S1 of the carrier plate 110. On the other hand, for the supporting assemblies 120 on the bottom surface S2 of the carrier plate 110, the supporting assemblies 120 (as shown in FIG. 2A, two supporting assemblies 1201 and 1202 along the Y axis in a middle transverse direction and close to two sides of the carrier plate 110) corresponding to two ends of the pressing strip 132 are required to improve the overall stiffness of the cushion member 121, so as for the screwing members 131 to pass through the pressing strip 132 and the supporting assemblies 120, so that the pressing strip 132 and the supporting assemblies 120 may be firmly screwed together. In particular, the filling member 122 (referring to FIG. 3, here the supporting assembly 1201 is taken as an example) used to be filled into the hollow portions 121a and 121c of the cushion member 121 may be formed by the same material as the carrier plate 110 and the abutting member 123 to facilitate screwing. In this way, the cushion member 121 may further be regarded as a reinforcing assembly of the pallet structure 100, so as to improve the bonding strength of the server rack 200 and the pallet structure 100 and improve the stability during the transportation.

Figure 4A:
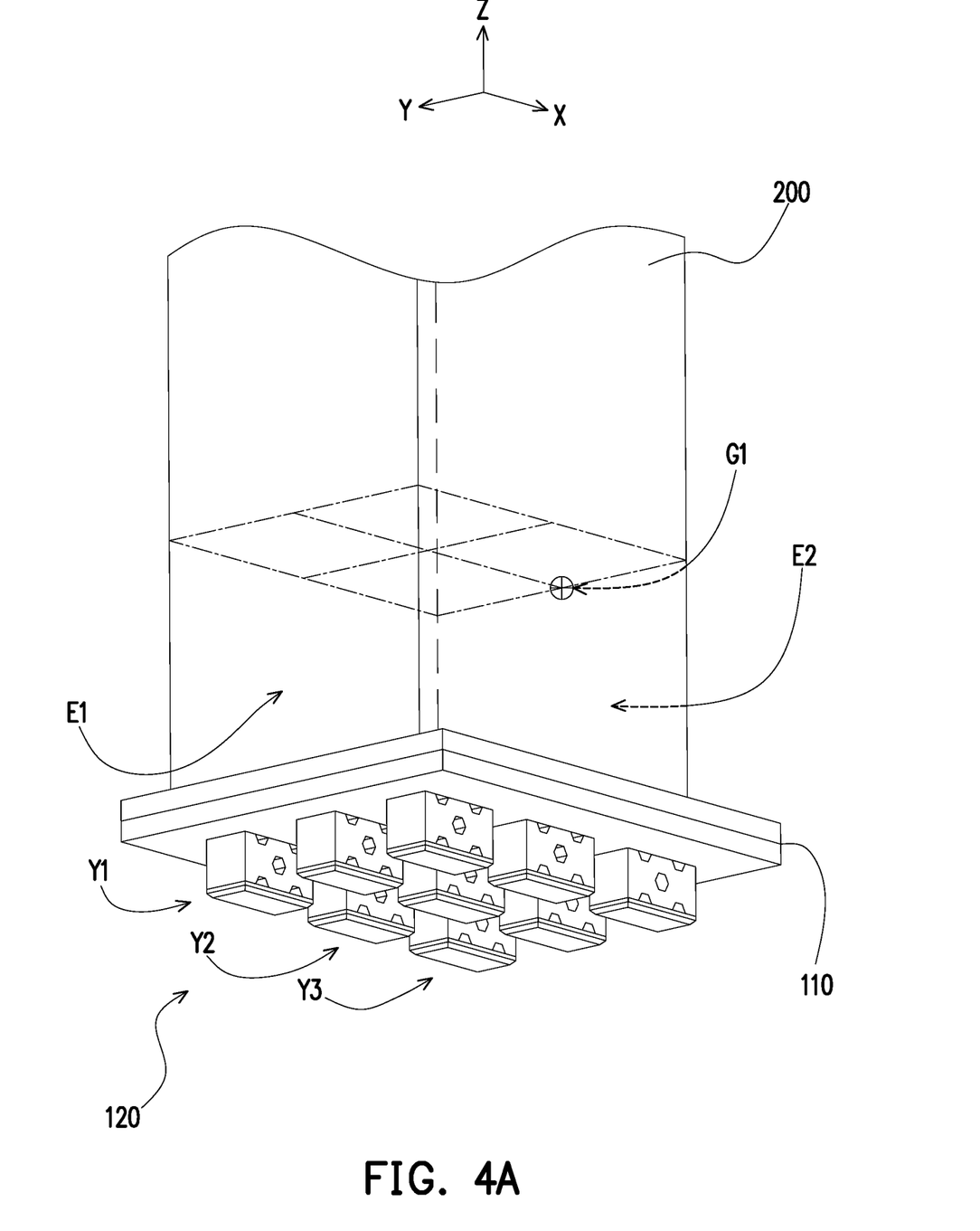
FIG. 4A is a schematic view of an application of a pallet structure according to another embodiment of the disclosure.
Figure 4B:
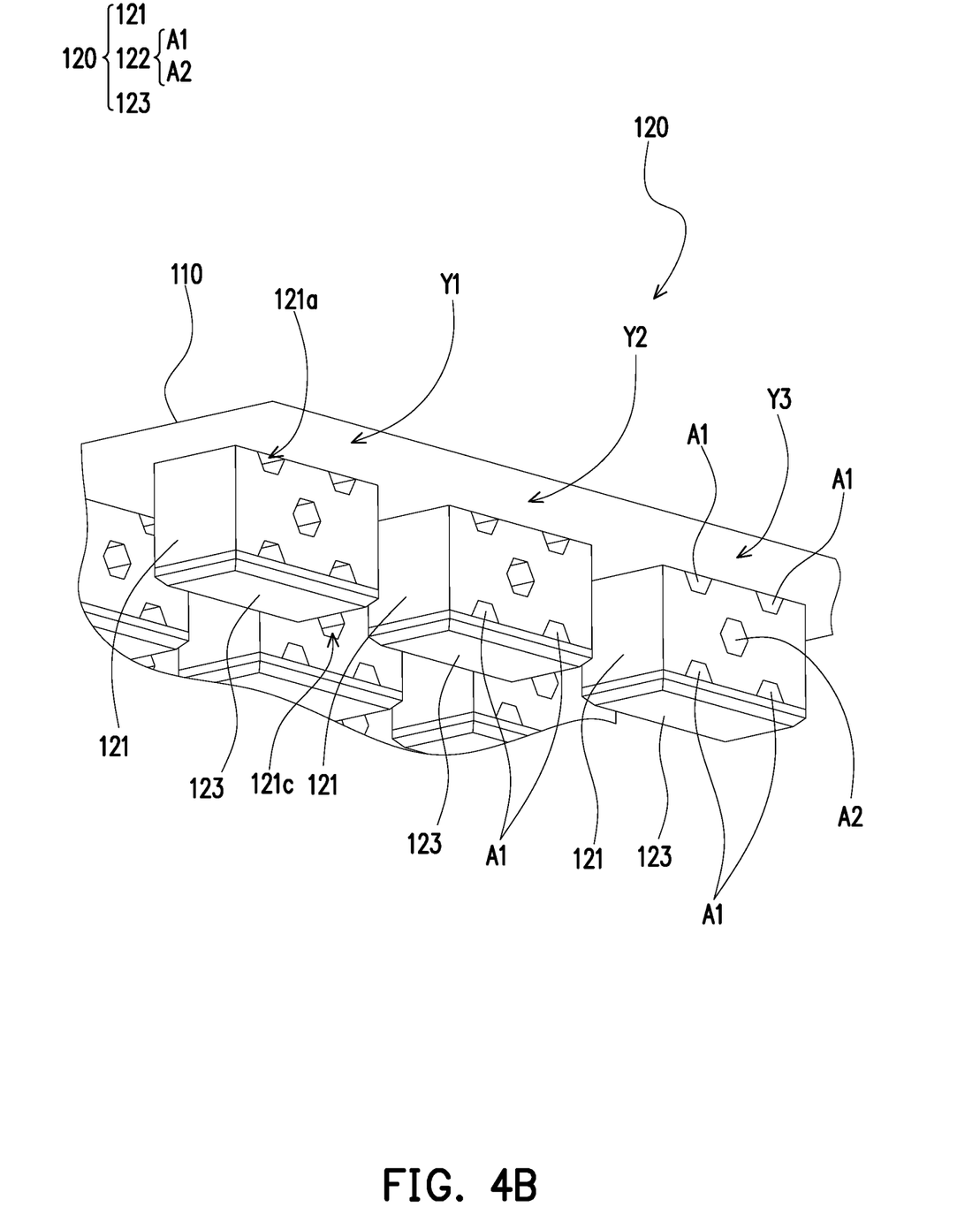
FIG. 4B is a partial enlarged view of FIG. 4A.

FIG. 4A is a schematic view of an application of a pallet structure according to another embodiment of the disclosure. FIG. 4B is a partial enlarged view of FIG. 4A. Referring to both FIGS. 4A and 4B, related reference numerals regarding the supporting assemblies 120 shown in FIG. 3 are still applied. In this embodiment, the supporting assemblies 120 are arranged in a 3×3 matrix as an example, and are divided into three rows (a rowY1, a rowY2, and a rowY3) along the Y axis here. In this embodiment, the overall stiffness of the cushion member 121 may be adjusted according to a center of gravity or weight distribution of the server rack 200. For example, if the server rack 200 has a center of gravity G1 located on a second side E2, the cushion member 121 located in the row Y3 corresponding to the second side E2 may fill all the hollow portions 121a and 121c with the filling member 122. As being away from the center of gravity G1, the cushion member 121 located in the row Y2 may only fill the hollow portion 121a close to the abutting member 123 with the filling member A1. For the cushion member 121 located at the farthest distance from the center of gravity G1, that is, the cushion member 121 in the row Y1 close to a first side E1, the filling member 122 in all the hollow portions 121a and 121c may be removed. In other words, the overall stiffness of the cushion member 121 increases as the cushion member 121 approaches the center of gravity G1 of the server rack 200 located on the carrier plate 110. That is, the overall stiffness of the cushion member 121 is proportional to the weight distribution of the server rack 200, so that the cushion member 121 with higher overall stiffness supports a part where the center of gravity G1 of the server rack 200 is located, which is beneficial to the stability of the transport mechanism 10.

Figure 5:
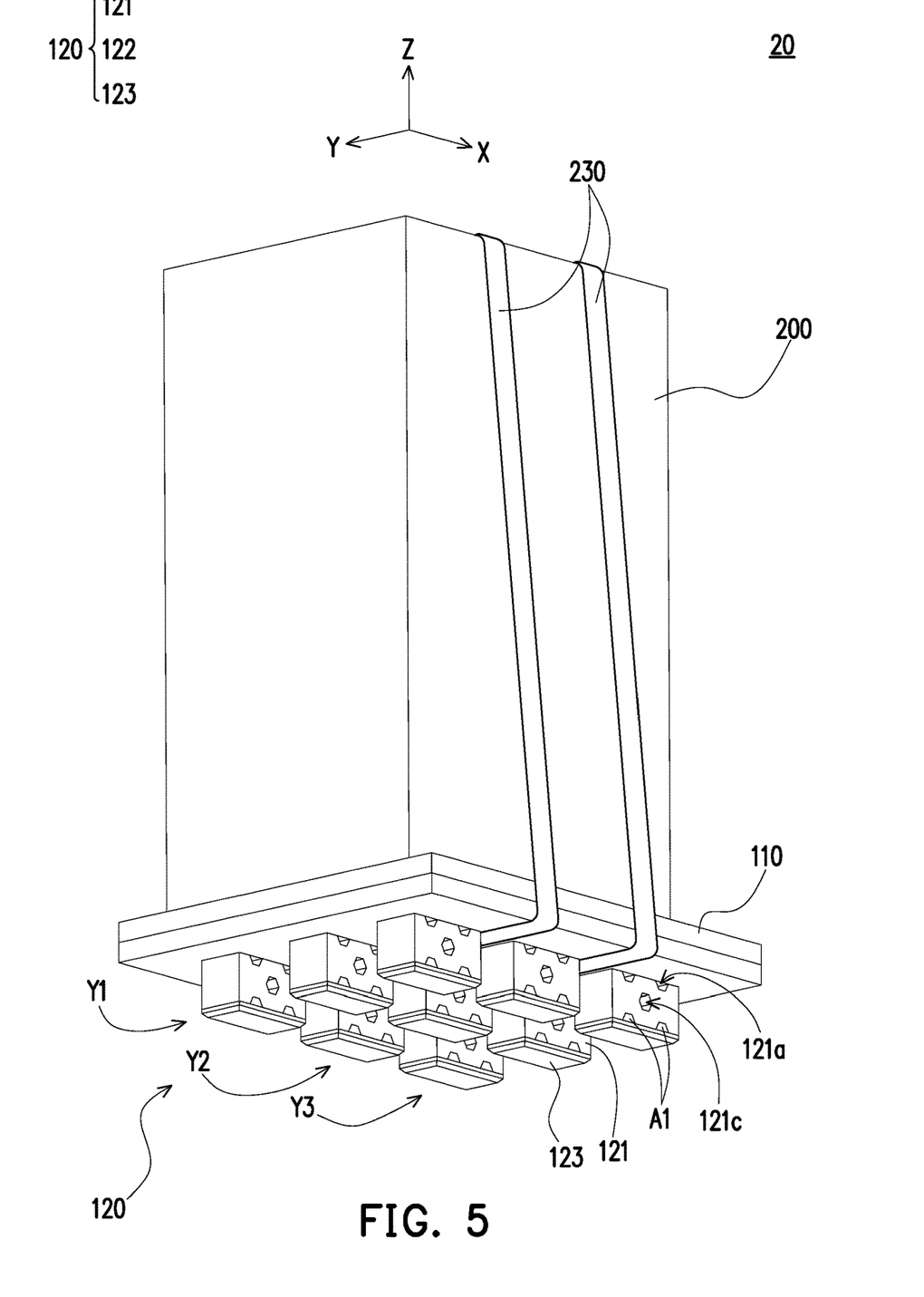
FIG. 5 is a schematic view of a transport mechanism according to another embodiment of the disclosure.

FIG. 5 is a schematic view of a transport mechanism according to another embodiment of the disclosure. Referring to FIG. 5 and comparing to FIGS. 1 and 2B, different from FIGS. 1 and 2B in which the fixing assembly 130 of the transport mechanism 10 includes the pressing strip 132, the fixing plates 133, and the screwing members 131, in FIG. 5, a fixing assembly 230 of a transport mechanism 20 is a strap. Here, the overall stiffness of the cushion member 121 may also be adjusted according to the center of gravity or the weight distribution of the server rack 200 as described above.

Figure 6:
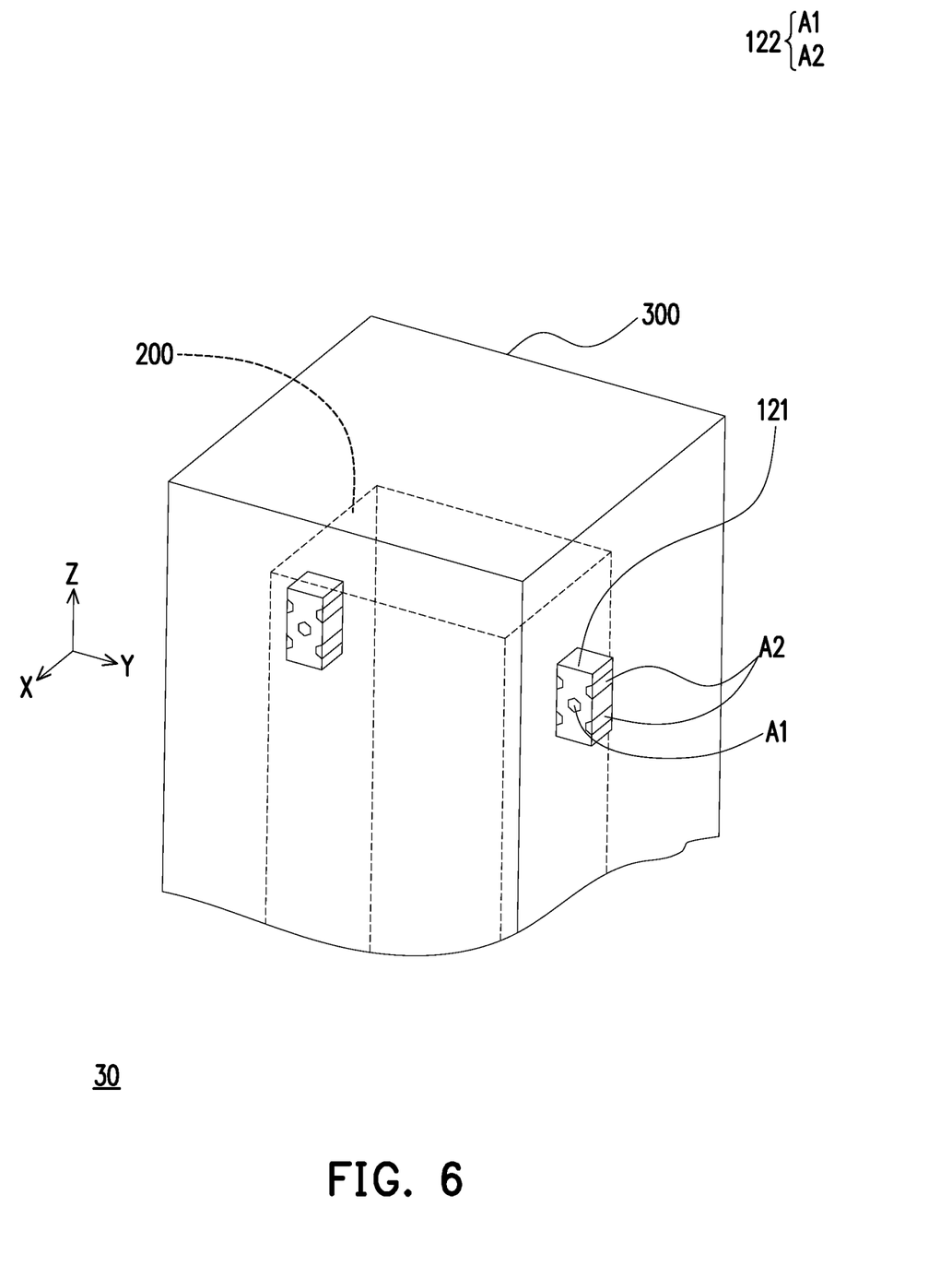
FIG. 6 is a schematic partial view of a transport mechanism according to another embodiment of the disclosure.

FIG. 6 is a schematic partial view of a transport mechanism according to another embodiment of the disclosure. Referring to FIG. 6 and comparing to FIG. 3, a transport mechanism 30 further includes a wooden box 300 for packaging and protecting the server rack 200. In addition, the cushion member 121 may be disposed between the server rack 200 and the wooden box 300 along the Z axis to provide the lateral shock absorption effect during the transportation. In this embodiment, the overall stiffness of the cushion member 121 may be adjusted according to a shaking amplitude of a top of the server rack 200. For example, if the shaking amplitude of the top of the server rack 200 is large, the filling member 122 may be filled into all the hollow portions 121a and 121c of the cushion member 121. If the shaking amplitude of the top of the server rack 200 is small, the filling member 122 may be removed from some or all of the hollow portions 121a and 121c of the cushion member 121. On the other hand, before the wooden box 300 is installed, the openings 121b and 121d of the hollow portions 121a and 121c are exposed to the external environment, so that the user may freely adjust the overall stiffness of the cushion member 121 at any time depending on the situations. The cushion member 121 in FIG. 6 is only used for illustration and is not used to limit the number of the cushion members 121, while the relationship to the number of the filling members 122 corresponding to the hollow portions 121a and 121c is also not limited.

Figure 7:
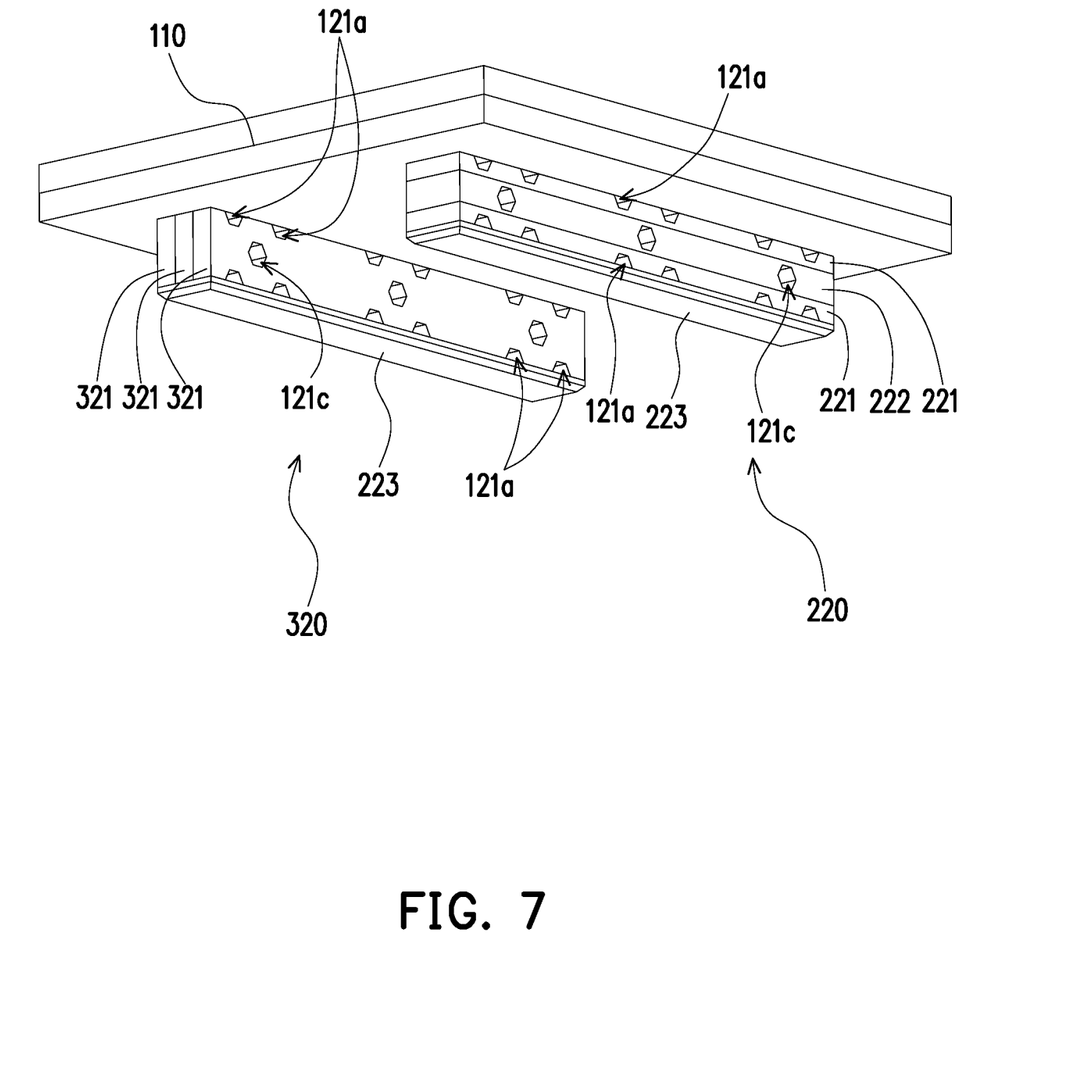
FIG. 7 is a schematic view of a supporting assembly according to another embodiment of the disclosure.

FIG. 7 is a schematic view of a supporting assembly according to another embodiment of the disclosure. The supporting assembly in this embodiment may be further adjusted according to various requirements. That is, there are many different variations shown in FIG. 7. Here, the variations are only gathered in FIG. 7 for illustration.

As shown on the right of FIG. 7, a supporting assembly 220 includes multiple cushion members 221 and 222 and an abutting member 223. The two cushion members 221 are identical to each other. The cushion members 221 and 222 are stacked between the carrier plate 110 and the abutting member 223, and the cushion member 222 is stacked between the two cushion members 221. In this embodiment, the cushion member 221 has the hollow portion 121a, and the cushion member 222 has the hollow portion 121c. Here, selection and a stacking relationship of the cushion members 221 and 222 are not limited, and the user may adjust the configuration of the cushion members 221 and 222 at any time according to the requirements.

Similarly, on the left of FIG. 7, a supporting assembly 320 includes three cushion members 321 and the abutting member 223. The three cushion members 321 are identical to one another, and are vertically stacked in a transverse direction and located between the carrier plate 110 and the abutting member 223, respectively. The cushion members 321 all have the uniform hollow portions 121a and 121c. Here, the number of the cushion members 321 is not limited, and the user may adjust the configuration of the cushion members 321 at any time according to the requirements.

Since the supporting assemblies 220 and 320 of FIG. 7 are strip-shaped, when the supporting assemblies 220 and 320 of FIG. 7 are applied to the pallet structure 100 of FIGS. 1 to 5, the supporting assemblies 220 and 320 may be arranged on the bottom surface S2 of the carrier plate 110 in a 1×3 matrix.

Figure 8A:
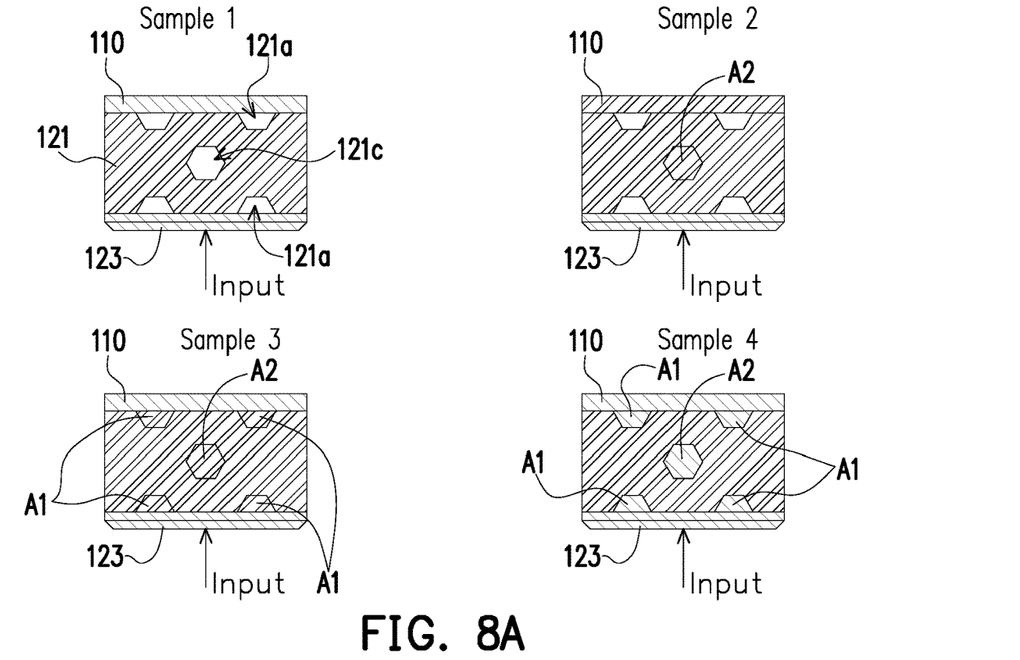
FIG. 8A is a side view of supporting assemblies according different embodiments of the disclosure.
Figure 8B:
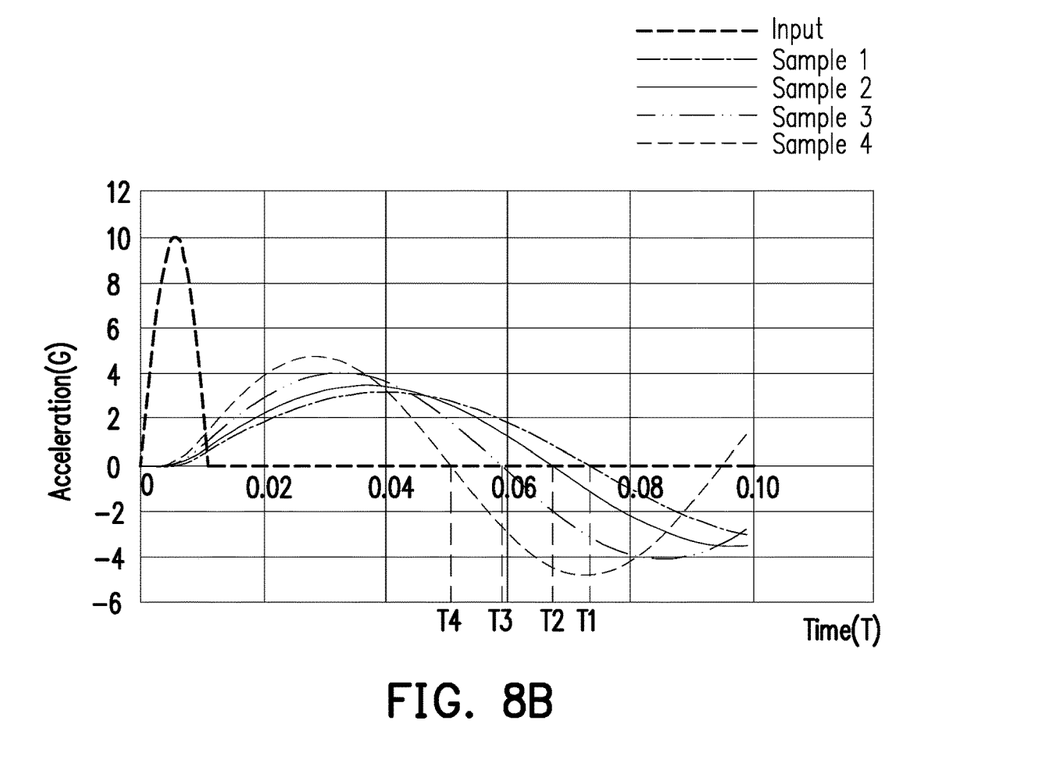
FIG. 8B is a view of a relationship of an impact simulation analysis of different support assemblies of FIG. 8A.

FIG. 8A is a side view of supporting assemblies according different embodiments of the disclosure. FIG. 8B is a view of a relationship of an impact simulation analysis of different support assemblies of FIG. 8A. As mentioned above, the overall stiffness of the cushion member 121 is appropriately adjusted according to the material and filling number of the filling member 122. Here, related impact simulations are provided for comparison. Furthermore, in the drawings, the same section lines denote the same materials.

As shown on the upper left of FIG. 8A, in a process of the impact simulation analysis, the impact is provided to the abutting member 123 (input), and a vibration state (output) of an object to be tested is checked accordingly. Here, the object to be tested is the server rack 200 of FIG. 1, but the disclosure is not limited thereto. In another embodiment, the object to be tested may be any object carried by the carrier plate 110. In FIG. 8A, a sample 1 is in a state in which the hollow portions 121a and 121c are not filled with any filling member 122. In a sample 2, the central hollow portion 121c is filled with the filling member A2, and the filling member A2 is formed by the same material as the cushion member 121. In a sample 3, all the hollow portions 121a and 121c are filled with the filling members A1 and A2, and the filling members A1 and A2 are formed by the same material as the cushion member 121. That is, the filling members A1 and A2 have the same stiffness as the cushion member 121. In a sample 4, all the hollow portions 121a and 121c are also filled with the filling members A1 and A2, but the filling members A1 and A2 are formed by the same material as the carrier plate 110 and the abutting member 123. That is, the stiffness of the filling members A1 and A2 is larger than the stiffness of the cushion member 121.

In this way, a result of the simulation analysis shown in FIG. 8B is that the cushion member 121 may reduce an impact value of the server rack 200. In addition, the larger the overall stiffness of the cushion member 121, the higher a frequency of the server rack 200 (short vibration period), and vice versa, the lower the frequency (long vibration period). Therefore, the effect of adjusting a system frequency (that is, the server rack 200 and a server host therein) may be achieved according to the above principles, so as to avoid resonance during the transportation. Here, an arrangement of magnitude of the overall stiffness of the cushion member 121 is (from small to large) the sample 1, the sample 2, the sample 3, and the sample 4, and an arrangement of lengths of the vibration period is (from long to short) a period T1 (the sample 1), a period T2 (the sample 2), a period T3 (the sample 3), and a period T4 (the sample 4). Accordingly, the results of the simulation analysis generated in FIGS. 8A and 8B may be used as a reference for the user to select the material (stiffness) and number of the filling members A1 and A2.

Based on the above, in the embodiments of the disclosure, whether it is in the transport mechanism of the server rack or in the pallet structure, the supporting assemblies are formed by at least one cushion member with smaller stiffness. The cushion member has at least one hollow portion, and the opening of the hollow portion is located outside the part where the cushion member is in contact with other components, so as to be exposed to the external environment. In this way, the cushion member provides the hollow portion for the user to adjust the overall stiffness.

More specifically, the supporting assemblies further includes at least one filling member, which may be filled into or removed from the hollow portion in cooperation with the cushion member. In this way, the user may easily and freely adjust the overall stiffness of the cushion member according to the situations (for example, according to the center of gravity or the weight distribution of the server rack or the shaking amplitude of the top of the server rack), which may not only effectively reduce the vibration and impact caused by the transportation process, but may also achieve the effect of adjusting the system frequency to avoid the resonance during the transportation.

What is claimed is:

1. A transport mechanism of a server rack, comprising:
a carrier plate;
a server rack disposed and fixed onto a top surface of the carrier plate; and
a plurality of supporting assemblies respectively stacked onto a bottom surface of the carrier plate, wherein each of the supporting assemblies comprises at least one cushion member, each of the cushion members has at least one hollow portion, an opening of the hollow portion is exposed to an external environment, and stiffness of the cushion member is smaller than stiffness of the carrier plate, wherein each of the supporting assemblies further comprises at least one filling member filled into the hollow portion or removed from the hollow portion through the opening of the hollow portion.

2. The transport mechanism of the server rack according to claim 1, wherein each of the supporting assemblies further comprises an abutting member disposed at a bottom of the cushion member, so that the cushion member is located between the bottom surface of the carrier plate and the abutting member, the opening of the hollow portion is oriented differently from the carrier plate and the abutting member, and stiffness of the abutting member is larger than the stiffness of the cushion member.

3. The transport mechanism of the server rack according to claim 1, wherein the hollow portion is a slot located on a surface of the cushion member or a through hole passing through the cushion member.

4. The transport mechanism of the server rack according to claim 1, wherein the hollow portion and the filling member are components with outlines complementary to each other.

5. The transport mechanism of the server rack according to claim 1, wherein stiffness of the filling member is larger than the stiffness of the cushion member.

6. The transport mechanism of the server rack according to claim 1, wherein the filling member and the cushion member has a same material.

7. The transport mechanism of the server rack according to claim 1, wherein the at least one filling member comprises a plurality of filling members, the at least one hollow portion comprises a plurality of hollow portions, and a number of the filling members is less than or equal to a number of the hollow portions.

8. The transport mechanism of the server rack according to claim 1, wherein the at least one filling member comprises a plurality of filling members, the at least one hollow portion comprises a plurality of hollow portions, and the overall stiffness of each of the cushion members is proportional to a number of the filling members.

9. The transport mechanism of the server rack according to claim 1, wherein the overall stiffness of each of the cushion members increases as the cushion member approaches a center of gravity of the server rack located on the carrier plate.

10. A pallet structure, comprising:
a carrier plate; and
a plurality of supporting assemblies respectively disposed on a bottom surface of the carrier plate, wherein a top surface of the carrier plate stands through the supporting assemblies after carrying an object, each of the supporting assemblies comprises at least one cushion member and an abutting member, the abutting member is located on a bottom surface of the cushion member, the cushion member is located between the carrier plate and the abutting member, each of the cushion members has at least one hollow portion, and an opening of the hollow portion is oriented differently from the carrier plate and the abutting member, wherein each of the supporting assemblies further comprises at least one filling member filled into the hollow portion or removed from the hollow portion through the opening of the hollow portion.

11. The pallet structure according to claim 10, wherein stiffness of the abutting member is larger than stiffness of the cushion member, and stiffness of the carrier plate is larger than the stiffness of the cushion member.

12. The pallet structure according to claim 10, wherein the hollow portion is a slot located on a surface of the cushion member or a through hole passing through the cushion member.

13. The pallet structure according to claim 10, wherein the hollow portion and the filling member are components with outlines complementary to each other.

14. The pallet structure according to claim 10, wherein stiffness of the filling member is larger than stiffness of the cushion member.

15. The pallet structure according to claim 10, wherein the filling member and the cushion member has a same material.

16. The pallet structure according to claim 10, wherein the at least one filling member comprises a plurality of filling members, the at least one hollow portion comprises a plurality of hollow portions, and a number of the filling members is less than or equal to a number of the hollow portions.

17. The pallet structure according to claim 10, wherein the at least one filling member comprises a plurality of filling members, the at least one hollow portion comprises a plurality of hollow portions, and overall stiffness of each of the cushion members is proportional to a number of the filling members.

18. The pallet structure according to claim 10, wherein overall stiffness of each of the cushion members increases as the cushion member approaches a center of gravity of the object located on the carrier plate.

\* \* \* \* \*